United States Patent
Saha et al.

(10) Patent No.: US 11,516,624 B2
(45) Date of Patent: Nov. 29, 2022

(54) USER DYNAMICS THROUGH WI-FI DEVICE LOCALIZATION IN AN INDOOR ENVIRONMENT

(71) Applicant: HUGHES SYSTIQUE PRIVATE LIMITED, New Delhi (IN)

(72) Inventors: Abheek Saha, Gurgaon (IN); Mayank Maheshwari, Gurgaon (IN); Arjun Roychowdhury, Rockville, MD (US)

(73) Assignee: HUGHES SYSTIQUE PRIVATE LIMITED, New Delhi (IN)

( * ) Notice: Subject to any disclaimer, the term of this patent is extended or adjusted under 35 U.S.C. 154(b) by 87 days.

(21) Appl. No.: 17/189,851

(22) Filed: Mar. 2, 2021

(65) Prior Publication Data

US 2021/0281976 A1 Sep. 9, 2021

(30) Foreign Application Priority Data

Mar. 3, 2020 (IN) .............................. 202011009114

(51) Int. Cl.
*H04W 4/029* (2018.01)
*H04B 17/318* (2015.01)
*H04W 84/12* (2009.01)

(52) U.S. Cl.
CPC .......... *H04W 4/029* (2018.02); *H04B 17/318* (2015.01); *H04W 84/12* (2013.01)

(58) Field of Classification Search
CPC ..... H04W 4/029; H04W 84/12; H04B 17/318
USPC ....................................... 455/456.1
See application file for complete search history.

(56) References Cited

U.S. PATENT DOCUMENTS

2014/0094187 A1\* 4/2014 LaMarca ............... G01S 5/0252
455/456.1
2019/0373413 A1\* 12/2019 Kong ..................... H04W 4/025

\* cited by examiner

*Primary Examiner* — Ted M Wang
(74) *Attorney, Agent, or Firm* — BakerHostetler (57) ABSTRACT

An indoor location positioning system comprises at least one processor, Wi-Fi scanners, and a RSSI fingerprint database. The Wi-Fi scanners and the RSSI fingerprint database works with the processor. The Wi-Fi scanners are positioned at locations within an environment that is partitioned into interconnected zones. The Wi-Fi scanners receive anonymous probe messages from Wi-Fi devices that are present in the environment during a calibration phase of the indoor location positioning system. The RSSI values are collated to create RSSI fingerprints corresponding to the different locations respectively. One or more of the Wi-Fi scanners are used as anchor scanners to counter the difference in transmit power levels of different Wi-Fi devices that result in different RSSI fingerprints for the different types of Wi-Fi devices, wherein the RSSI value at each anchor scanner is subtracted from the RSSI values at rest of the Wi-Fi scanners to generate the RSSI fingerprint.

8 Claims, 6 Drawing Sheets

USER DYNAMICS THROUGH WI-FI DEVICE LOCALIZATION IN AN INDOOR ENVIRONMENT

CROSS REFERENCE TO RELATED APPLICATION

This application claims priority to Indian Application No. 202011009114, filed Mar. 3, 2020, the disclosure of which is hereby incorporated in its entirety by reference herein.

FIELD OF THE INVENTION

The present invention is related to the field of Wi-fi device localization in an indoor environment, and more particularly related to an application of user dynamics through Wi-Fi device localization in an indoor environment, where a user having the Wi-fi device is moving within the indoor environment.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Crowd movement inside a market arena has become an area of interest as it deals with business management. Each individual in a crowd is different in their choice of commodities that they want to purchase from a certain market arena, and therefore how they approach the market arena with their needs vary considerably. Some individuals in the crowd have specific needs while others may just want to spend some time shopping for random things. There are electronic surveillance devices which are provided at the entry of such market arenas, for example, indoor arenas like malls, which record the number of people entering and leaving the premises, but however this method doesn't record the actual movement of the crowd inside the mall. Furthermore, surveillance cameras are also positioned in different areas that record the movement of the crowd, but only provides a manual visual idea of whether a certain group in the crowd is concentrated in a certain area of the shopping mall, or whether an individual is visiting a store periodically, etc. However, this fails to provide information regarding the actual movement of the crowd inside the mall.

In the current scenario, the tracking of crowd movement in indoor arenas using location tracking is an emerging technology that enables businesses such as retailers and hoteliers to better track movement patterns of visitors. This enables business to better understand key metrics, for example, in and out count, dwell time that denotes how much time is spent at specific locations, as well as path navigation maps that generally indicate the most popular routes taken by the user once inside the facility. These metrics in turn helps businesses to optimize operations in many different ways. Maximizing customer safety, scheduling of optimal workforce placements and product placements are just a few examples. Other examples include the much-needed application in the field of public safety where a method or device is required to prevent stampedes that may occur as a result of unmonitored movement of crowd in a certain type of market place. Such stampede can only be monitored if there is a real time analytical procedure to monitor the nature and density of crowd movement in such type of market places.

However, there are certain problems faced during tracking of the movement of visitors in an indoor environment. These problems include (1) Localization of visitor, or Visitor's device, in indoor environment, (2) Tracking movement of visitor from one location to another, (3) Combining of individual movement patterns into group dynamics in the context of a specific indoor layout, (4) the requirement of user privacy, since the current systems because do not track individual visitors, but rather massed movements, etc. Therefore, there is a need for a method and devices associated with the method that overcomes the aforementioned problems.

Therefore, there is a need to apply user dynamics through Wi-Fi device localization in an indoor environment to monitor crowd movement within the indoor environment. Each problem that is addressed in the conventional systems needs to be dealt separately. For the problem of visitor localization, various approaches based on Cellular, Bluetooth, and Wi-Fi technologies are used for indoor localization. Wi-Fi RSSI (Received Signal Strength Indicator) fingerprinting based methods are popular because they do not require active participation from tracked devices and require minimal infrastructure cost. However, these approaches are constrained by the differences in the transmission characteristics of Wi-Fi devices. Differences in transmission characteristics result in sub-optimal localization accuracy.

In addition to the matter above, for tracking the movement of Wi-Fi devices across various locations, the preferred method is to track individual devices using a common identifier such as the Wi-Fi MAC address. However, this infringes on the user's privacy. Furthermore, modern devices employ MAC randomization wherein instead of using the actual MAC of the device, a randomly generated MAC address is used in Wi-Fi packets when the device is not connected to any access point. Since the MAC address used by a device keeps changing, tracking the journey of the device across different locations becomes very difficult. Hence, there is a need for a method or a system for improving indoor localization and device tracking accuracy, considering the differences in transmission characteristics of devices and MAC randomization performed by modern phones.

SUMMARY OF THE INVENTION

It is intended that all such features, and advantages be included within this description, be within the scope of the present invention, and be protected by the accompanying claims. The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

The indoor location positioning system disclosed here addresses the need for a method and a system for improving indoor localization and device tracking accuracy, considering the differences in transmission characteristics of devices and MAC randomization performed by modern phones.

An indoor location positioning system comprises at least one processor, Wi-Fi scanners, and a RSSI fingerprint database. The Wi-Fi scanners and the RSSI fingerprint database are configured to work with the at least one processor. The Wi-Fi scanners are positioned at a plurality of locations within an environment, wherein the environment is partitioned into interconnected zones, wherein the Wi-Fi scanners receive anonymous probe messages from Wi-Fi devices that are present in the environment during a calibration phase of the indoor location positioning system. The RSSI values of the anonymous probe messages received by the Wi-Fi scanners are collated to create RSSI fingerprints corresponding to the different locations respectively. One or more of the Wi-Fi scanners are used as anchor scanners to counter the difference in transmit power levels of different Wi-Fi devices that result in different RSSI fingerprints for the different types of Wi-Fi devices, wherein the RSSI value at each anchor scanner is subtracted from the RSSI values at rest of the Wi-Fi scanners to generate the RSSI fingerprint.

The RSSI fingerprint database is generated after the calibration phase that contains the generated RSSI fingerprints corresponding to the different locations. The processor, after the calibration phase, matches the RSSI fingerprint of the anonymous probe messages from the Wi-Fi devices against the RSSI fingerprints recorded during the calibration phase to predict the location of the Wi-Fi device in a prediction phase. In an embodiment, the indoor location positioning system further comprises a first correction procedure that involves correction for Wi-Fi channel dependency. The Wi-Fi scanners that are used in the location prediction are tuned to a same channel instead of performing frequency hopping to counter impact of differences of impairment on different channels resulting in different RSSI values on the different channels.

In an embodiment, the indoor location positioning system further comprises a second correction that involves correction for Wi-Fi orientation of the Wi-Fi devices. Different orientations of the Wi-Fi devices are used during the calibration phase to counter inconsistency in accuracy during the prediction phase because the RSSI values change with change in the orientation of the Wi-Fi device during the calibration phase and location prediction phase. A third correction is also disclosed that involves the usage of the anchor scanners to counter the difference in transmit power levels of different Wi-Fi devices. In an embodiment, the indoor location positioning system further comprises a fourth correction that involves mapping user data associated with each of the W-Fi devices to an indoor topology of the environment and use the mapping to measure group dynamics of the Wi-Fi devices.

In view of the above, an independent method is disclosed for indoor location positioning of Wi-Fi devices using RSSI fingerprinting of anonymous probe messages transmitted by Wi-Fi devices. RSSI fingerprinting methods require training/calibration on each new place since no two indoor environments have the same signal propagation characteristics. Based on the disclosed method, the accuracy of location prediction does not change if the type of training device is different from the type of tracked device. The method comprises the following steps:

i. Creating RSSI fingerprint by collecting anonymous probe messages transmitted by Wi-Fi device on strategically placed scanners tuned to one single Wi-Fi channel
ii. Collecting RSSI fingerprint by placing training Wi-Fi device in different orientations at the same location.
iii. Use of differential RSSI in creating RSSI fingerprint instead of using actual RSSI value received at each scanner.

Subsequently demonstrating the use of the above method in measuring bulk movement of users in an indoor arena with a known topology. By taking the predicted location as an outcome of the RSSI fingerprinting activity and mapping it to a known indoor topology, we can track group dynamics of users, including arrival and departure rates, the 'stability' of the indoor population, concentration hotspots and the flow of users from one point to another within the indoor area in a secure and anonymous manner. By adding more and more monitors, we can get more accuracy using the same basic set of tools.

BRIEF DESCRIPTION OF DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DESCRIPTION OF THE INVENTION

The aim of the present invention is to track crowd movement in indoor arenas using location tracking, wherein user dynamics is applied through Wi-Fi device localization in an indoor environment. The foregoing advantages as well as the working of the method that involves the application of user dynamics for Wi-Fi device localization and components associated with the method will become more noticeable and understandable from the following detail description thereof when read in conjunction with the accompanying drawings.

Figure 1A:
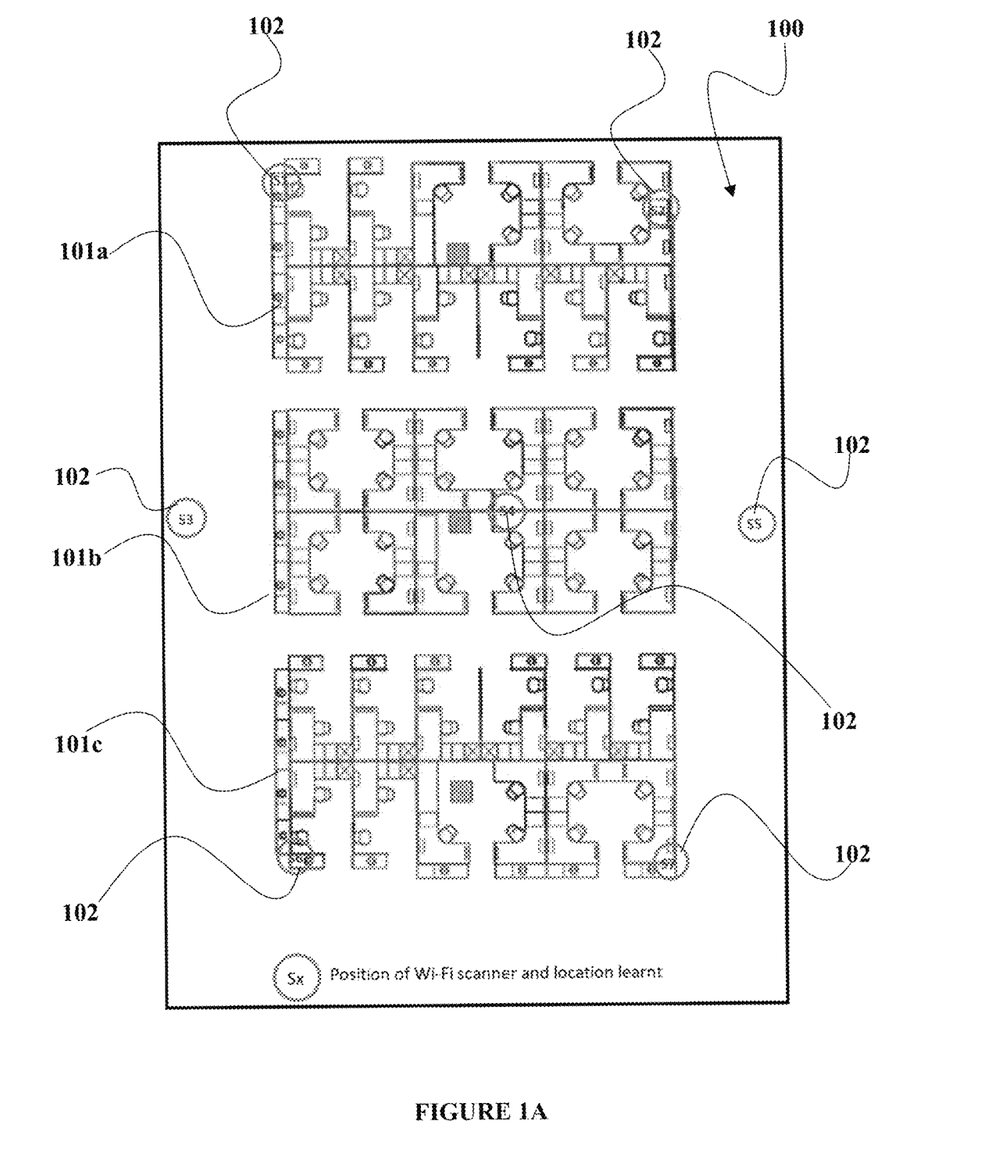
FIG. 1A is the schematic view of Wi-Fi Scanner placement in an indoor arena, which further describes the working of the Wi-Fi RSSI fingerprinting technique.
Figure 1B:
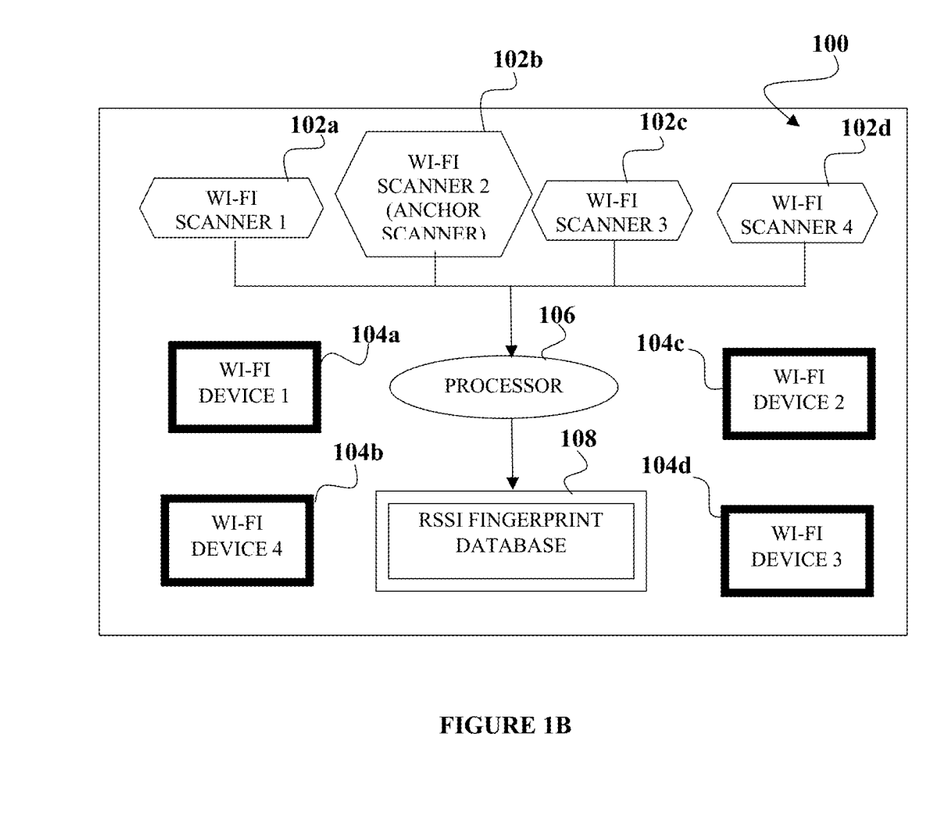
FIG. 1B is a system diagram corresponding to the the schematic view of Wi-Fi Scanner placement in an indoor arena as shown in the FIG. 1A, which also describes the working of the Wi-Fi RSSI fingerprinting technique.
Figure 5:
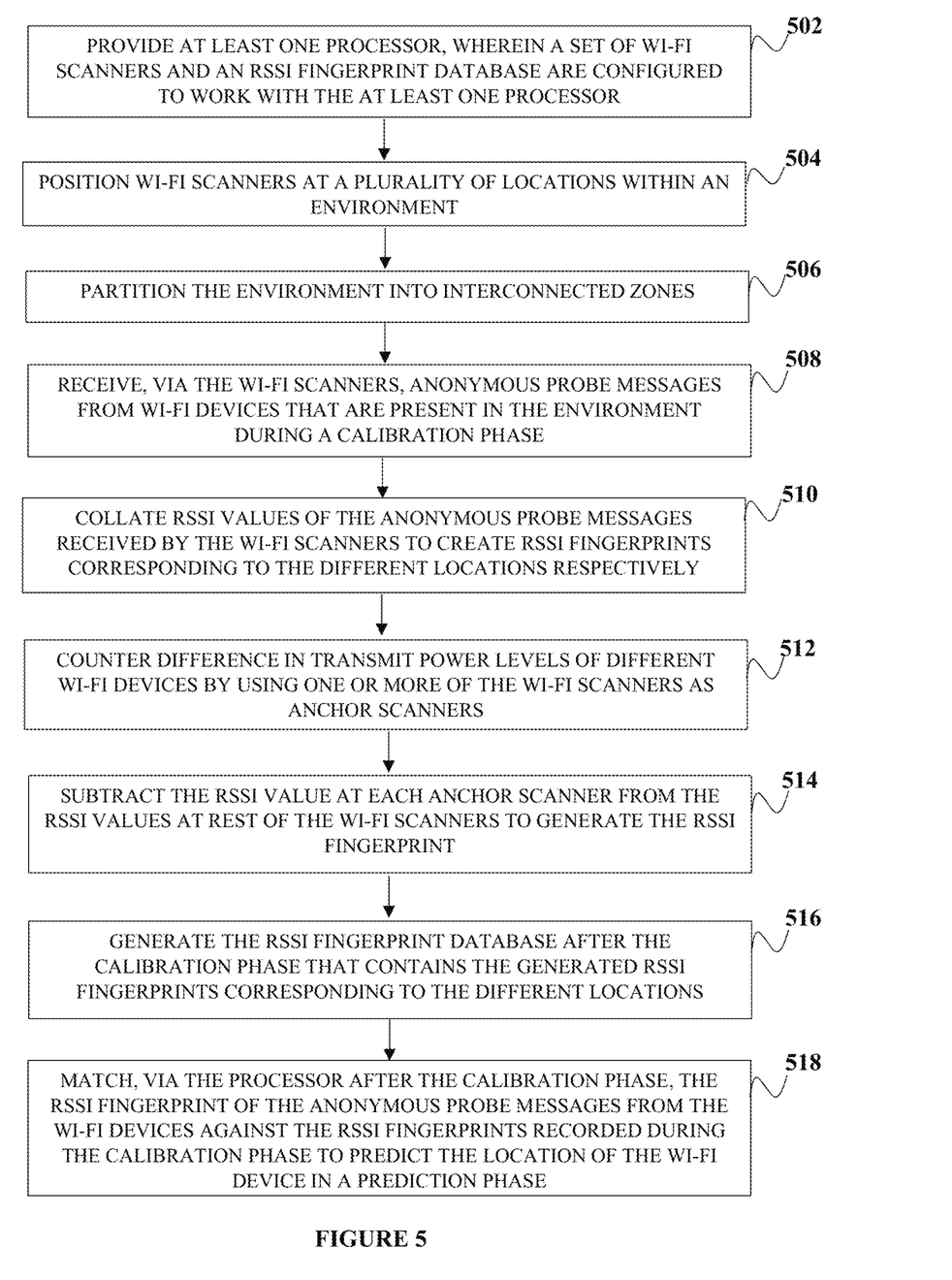
FIG. 5 is a method flow diagram that explains the step-by-step process associated with indoor location positioning using Wi-Fi scanners in the Wi-Fi RSSI fingerprinting technique.

Regarding FIGS. 1A-1B and FIG. 5, FIG. 1A is the schematic view of Wi-Fi Scanner 102 placement in an indoor arena 100, which further describes the working of the Wi-Fi RSSI fingerprinting technique. FIG. 1B is a system diagram corresponding to the schematic view of Wi-Fi scanners 102 that are positioned in an indoor arena 100 as shown in the FIG. 1A and described in FIG. 5, which also describes the working of the Wi-Fi RSSI fingerprinting technique. The Wi-Fi RSSI fingerprinting technique used here resolves the problem of Wi-Fi device localization, for example, a mobile phone. This method includes learning RSSI fingerprints or RSSI patterns for areas/zones of interest in any indoor environment 100 and consequently using the learnt association between RSSI values and position data to make precise predictions of device locations in unmarked readings. The Wi-Fi RSSI fingerprinting technique consists of two phases: (a) calibration/training phase and (b) a location prediction phase. In the method disclosed herein, the local area or the indoor environment 100 is partitioned 506 into a graph-pattern of interconnected zones 101a, 101b, and 101c, where each zone characterizes a coverage zone for the Wi-Fi access, as further described in FIG. 2. During the training phase, probes are generated that are associated with their location and the corresponding fingerprints consisting of RSSI readings.

Furthermore, at least one processor 106 is provided 502 as shown in FIG. 5, wherein the Wi-Fi scanners 102 and an RSSI fingerprint database 108 are configured to work with the at least one processor 106, as shown in FIG. 1B. As explained above, the Wi-Fi scanners 102 are positioned at multiple locations within the environment 100. The RSSI fingerprints are configured to train machine learning based classification algorithms. Later on, the trained classification algorithms are configured to predict the location of a Wi-Fi device 104 using RSSI fingerprint. These RSSI fingerprinting methods necessitate training/calibration on each new place since no two indoor environments 100 have the same signal propagation characteristics. During the calibration phase, the Wi-Fi scanners 102 are placed at different locations and are set up to record the RSSI value of received 508 anonymous probe messages. The Wi-Fi scanners 102 are, for example, 102a, 102b, 102c, and 102d, as shown in FIG. 1B. In another embodiment, Wi-Fi devices 104a, 104b, 104c, and 104d, for example, are transmitters that are placed at various locations of interest. RSSI values of anonymous probe messages received by Wi-Fi scanners 102 are collated 510 to create the RSSI fingerprint corresponding to a location. For example if n Wi-Fi scanners 102 are being used, and RSSI value of a probe request is R_j at scanner S_j, where j∈[1 . . . n] a typical RSSI fingerprint tuple with RSSI values from all n Wi-Fi scanners 102 would be S_1:R_1, S_2:R_2,S_3:R_3,S_4:R_4,S_5:R_5,S_6:R_6, . . . S_n: R_n. The output of the calibration/training phase is an RSSI fingerprint database 108 corresponding to each location of interest is as shown in FIGS. 1A-1B. In the location prediction phase, the RSSI fingerprint of probe messages from a Wi-Fi device 104 is used to perform a match against the RSSI fingerprint recorded during the calibration phase. Based on this match, the location of the transmitting Wi-Fi device 104 is predicted.

The basic premise of RSSI fingerprinting method is that the combination of RSSI values measured by the different Access Points are unique for each learnt location and remains constant across different categories of Wi-Fi devices 104a, 104b, 104c, and 104d placed at that location and other environmental changes. The Wi-Fi devices 104a, 104b, 104c, and 104d are, for example, Wi-Fi device 1, 2, 3, and 4 as shown in FIG. 1B. However, tests advise that apart from distance between the transmitting Wi-Fi device 104 and Wi-Fi scanner 102 and propagation characteristics of indoor environment 100, the RSSI fingerprint changes with: (1) Wi-Fi channel being used by transmitting device and Wi-Fi scanner 102, (2) Orientation of Wi-Fi device 104, and (3) Wi-Fi chipset used in device. If any of the above aspects during location prediction phase is different from those during the calibration phase, the accuracy of location prediction is considerably compromised. Change in RSSI fingerprint of mobile devices using different chipsets propose that the calibration phase should include all probable types of devices that are used during location prediction. For any deployment scenario, it is not possible to use every type of device during the calibration phase.

Considering the above-mentioned problems faced in the RSSI fingerprint techniques, there are certain enhancements that are provided to the RSSI fingerprinting process to overcome the problems. A set of corrections are applied to improvise indoor positioning, and by using these corrections, the location prediction accuracy of the system is significantly improved. The first correction involves correction for Wi-Fi channel dependency. Here, owing to different path loss characteristics of different Wi-Fi channels, RSSI values of Wi-Fi packets on different channels differ significantly. To counter 512 the impact of the difference in RSSI values on different channels, all the Wi-Fi scanners 102a, 102b, 102c, and 102d that are used in location tracking is tuned to the same channel instead of performing frequency hopping.

The second correction involves correction for Wi-Fi orientation, where the RSSI value changes with change in the orientation of the Wi-Fi device 104, for example, a mobile phone. This impacts the accuracy of prediction. If the phone orientation during the calibration phase and location prediction phase is different, the prediction accuracy is usually not high. To mitigate this issue, different phone orientations are used during the calibration phase. The third correction involves correction for Wi-Fi device 104 type, where each Wi-Fi device or chipset, has different transmission characteristics. These differences result in different RSSI fingerprints for different types of devices 104, even when they are placed at the same location in the same orientation. To overcome the issues caused by the difference in transmit power level of devices 104, one of the Wi-Fi scanners 102 is used as an anchor scanner, for example, anchor scanner 102b as shown in FIG. 1B.

For generating an RSSI fingerprint, instead of using absolute RSSI value at every scanner 102, the RSSI value at the anchor scanner 102b is subtracted 514 from RSSI value at every other scanner 102a, 102c, or 102d. The fourth and the final correction involves to map the user data to an indoor topology and use it to measure group dynamics. This involves three sub-steps, which is described in FIGS. 2, 3, 4, and 5. In view of the above, the RSSI fingerprint database 108 is generated 516 after the calibration phase that contains the generated RSSI fingerprints corresponding to the different locations. Thereafter, the processor 106 matches 518 the RSSI fingerprint of the anonymous probe messages from the Wi-Fi devices 104 against the RSSI fingerprints recorded during the calibration phase to predict the location of the Wi-Fi device 104 in a prediction phase.

Figure 2:
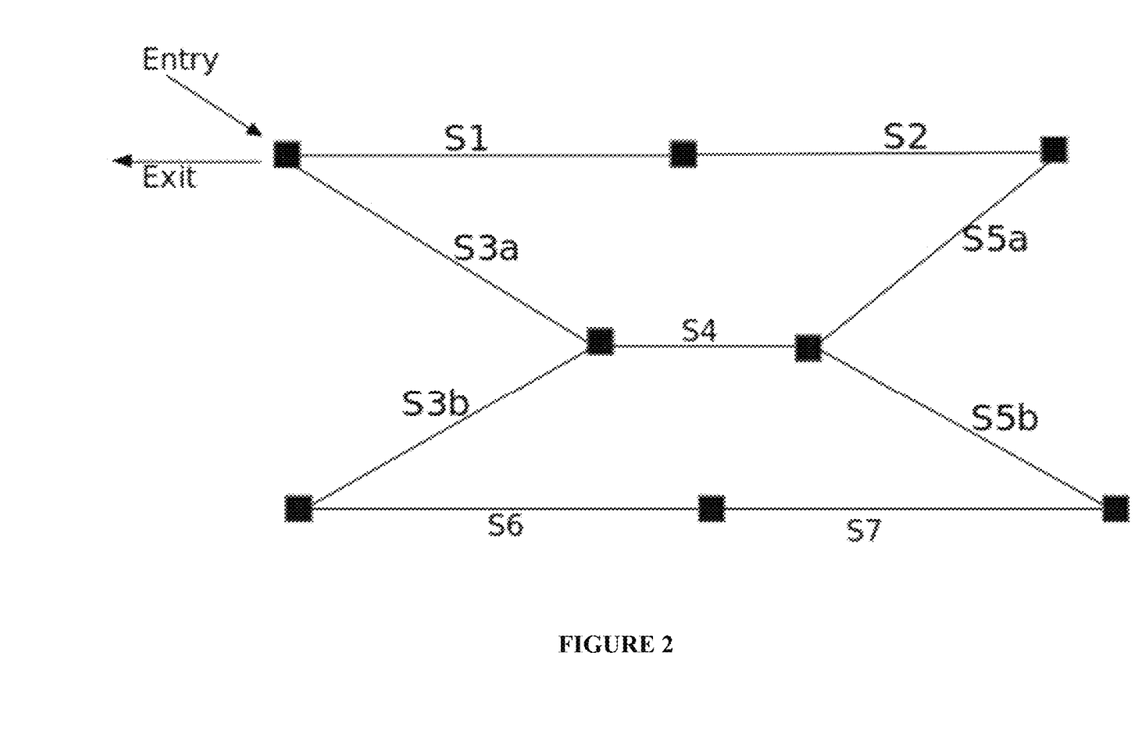
FIG. 2 is a converted stylized graph of the schematic view of the layout of the indoor arena as shown in FIG. 1A.

FIG. 2 is a converted stylized graph of the schematic view of the layout of the indoor arena 100 as shown in FIGS. 1A-1B. RSSI fingerprinting process is used to convert each received probe, as described in FIGS. 1A-1B, to a likely location on the graph that is, where location refers to one of the edges S1, S2, etc. The group dynamic information is also measured in terms of the graph for instance, the current occupancy of the edge S1, or the transition probability of S6 to S7.

Figure 3:
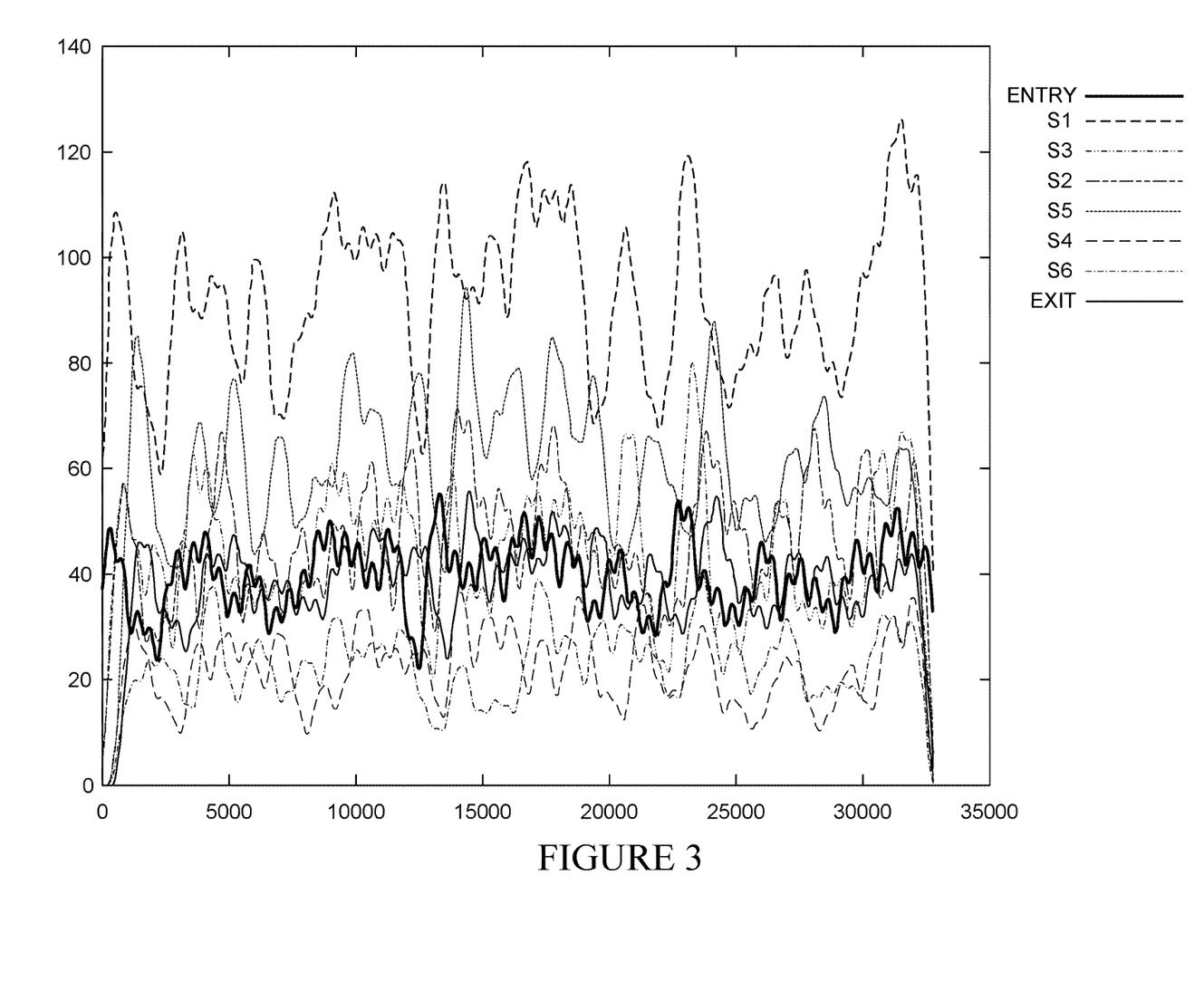
FIG. 3 is a graphical view showing the de-spread occupancy data for all edges in an indoor topology that is shown in FIG. 2.

FIG. 3 is a graphical view showing the de-spread occupancy data for all edges in an indoor topology that is shown in FIG. 2. The second step involves de-spreading of the received probe data, using a raised cosine filter, so as to generate an estimate of the occupancy of each edge as a continuous function $S_i(t)$ for each $i^{th}$ edge.

Figure 4:
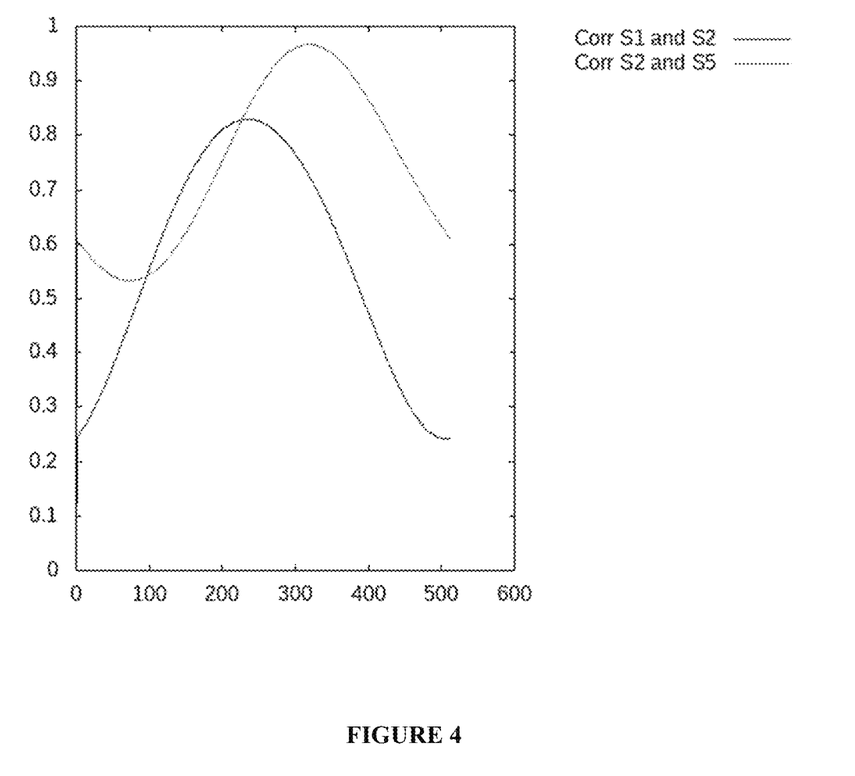
FIG. 4 is a graphical view showing correlation between edges, and further showing relative drift rate over the network based on the graphical view in FIG. 2.

FIG. 4 is a graphical view showing correlation between edges S1, S2, etc., and further showing relative drift rate over the network based on the graphical view in FIG. 2. The final stage involves the estimation of group dynamics by tracking the occupancy of each edge against the adjacent edges, using standard time-series techniques. For example, FIG. 4 shows the correlation between adjacent edges S1 and S2 and then between S2 and S5 (as shown in the graph of FIG. 2). By comparing the estimation peaks, a user measures bulk statistic, such as the drift rate between the two edges.

As will be appreciated by one of skill in the art, the present invention may be embodied as a method, system and apparatus. Accordingly, the present invention may take the form of an entirely hardware embodiment, a software embodiment or an embodiment combining software and hardware aspects.

It will be understood that each block of the block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the drawings and specification, there have been disclosed exemplary embodiments of the invention. Although specific terms are employed, they are used in a generic and descriptive sense only and not for purposes of limitation of the scope of the invention.

We claim:

1. An indoor location positioning system comprising:
   at least one processor, wherein a set of Wi-Fi scanners and an RSSI fingerprint database are configured to work with the at least one processor;
   the Wi-Fi scanners are positioned at a plurality of locations within an environment, wherein the environment is partitioned into interconnected zones, wherein the Wi-Fi scanners receive anonymous probe messages from Wi-Fi devices that are present in the environment during a calibration phase of the indoor location positioning system, and wherein RSSI values of the anonymous probe messages received by the Wi-Fi scanners are collated to create RSSI fingerprints corresponding to the different locations respectively;
   wherein one or more of the Wi-Fi scanners are used as anchor scanners to counter the difference in transmit power levels of different Wi-Fi devices that result in different RSSI fingerprints for the different types of Wi-Fi devices, wherein the RSSI value at each anchor scanner is subtracted from the RSSI values at rest of the Wi-Fi scanners to generate the RSSI fingerprint;
   the RSSI fingerprint database is generated after the calibration phase that contains the generated RSSI fingerprints corresponding to the different locations; and
   the processor, after the calibration phase, matches the RSSI fingerprint of the anonymous probe messages from the Wi-Fi devices against the RSSI fingerprints recorded during the calibration phase to predict the location of the Wi-Fi device in a prediction phase.

2. The indoor location positioning system claimed in claim 1, further comprising a first correction procedure that involves correction for Wi-Fi channel dependency, wherein the Wi-Fi scanners that are used in the location prediction are tuned to a same channel instead of performing frequency hopping to counter impact of differences of impairment on different channels resulting in different RSSI values on the different channels.

3. The indoor location positioning system claimed in claim 1, further comprising a second correction that involves correction for Wi-Fi orientation of the Wi-F devices, wherein different orientations of the Wi-Fi devices are used during the calibration phase to counter inconsistency in accuracy during the prediction phase because the RSSI values change with change in the orientation of the Wi-Fi device during the calibration phase and location prediction phase, and followed by a third correction that involves the usage of the anchor scanners to counter the difference in transmit power levels of different Wi-Fi devices.

4. The indoor location positioning system claimed in claim 1, further comprising a fourth correction that involves mapping user data associated with each of the W-Fi devices to an indoor topology of the environment, and use the mapping to measure group dynamics of the Wi-Fi devices.

5. A method for indoor location positioning comprising:
   providing at least one processor, wherein a set of Wi-Fi scanners and an RSSI fingerprint database are configured to work with the at least one processor;
   positioning Wi-Fi scanners at a plurality of locations within an environment;
   partitioning the environment into a into interconnected zones;
   receiving, via the Wi-Fi scanners, anonymous probe messages from Wi-Fi devices that are present in the environment during a calibration phase;
   collating RSSI values of the anonymous probe messages received by the Wi-Fi scanners to create RSSI fingerprints corresponding to the different locations respectively;
   countering difference in transmit power levels of different Wi-Fi devices by using one or more of the Wi-Fi scanners as anchor scanners, which result in different RSSI fingerprints for the different types of Wi-Fi devices;
   subtracting the RSSI value at each anchor scanner from the RSSI values at rest of the Wi-Fi scanners to generate the RSSI fingerprint;
   generating the RSSI fingerprint database after the calibration phase that contains the generated RSSI fingerprints corresponding to the different locations; and
   matching, via the processor after the calibration phase, the RSSI fingerprint of the anonymous probe messages from the Wi-Fi devices against the RSSI fingerprints recorded during the calibration phase to predict the location of the Wi-Fi device in a prediction phase.

6. The method as claimed in claim 5, further comprising correcting for Wi-Fi channel dependency via a first correction procedure, wherein the Wi-Fi scanners that are used in the location prediction are tuned to a same channel instead of performing frequency hopping to counter impact of differences of impairment on different channels resulting in different RSSI values on the different channels.

7. The method as claimed in claim 5, further comprising correcting for Wi-Fi orientation of the Wi-Fi devices via a second correction, wherein different orientations of the Wi-Fi devices are used during the calibration phase to counter inconsistency in accuracy during the prediction phase because the RSSI values change with change in the orientation of the Wi-Fi device during the calibration phase and location prediction phase, and followed by a third correction that involves the usage of the anchor scanners to counter the difference in transmit power levels of different Wi-Fi devices.

8. The method as claimed in claim 5, further comprising mapping user data associated with each of the W-Fi devices via a fourth correction, to an indoor topology of the environment, and use the mapping to measure group dynamics of the Wi-Fi devices.

* * * * *